United States Patent [19]

Lange

[11] 4,045,244
[45] Aug. 30, 1977

[54] REMOVAL OF MICROBIOLOGICAL DEPOSITS

[75] Inventor: K. Robert Lange, Huntingdon Valley, Pa.

[73] Assignee: Betz Laboratories, Inc., Trevose, Pa.

[21] Appl. No.: 683,609

[22] Filed: May 5, 1976

Related U.S. Application Data

[62] Division of Ser. No. 400,461, Sept. 24, 1973, abandoned.

[51] Int. Cl.² .............................................. B08B 9/00
[52] U.S. Cl. .............................. 134/22 R; 134/22 C; 162/161; 210/64; 252/106; 424/322; 424/325
[58] Field of Search ............... 162/161, 199; 424/322, 424/325, 329; 71/67; 252/106, 544; 134/22 C, 26, 22 R; 210/64

[56] References Cited

U.S. PATENT DOCUMENTS

| | | | |
|---|---|---|---|
| 2,393,293 | 1/1946 | Corley | 71/67 |
| 3,138,533 | 6/1964 | Heim et al. | 162/161 |
| 3,247,054 | 4/1966 | Hodge | 210/64 |
| 3,454,427 | 7/1969 | Suzuki et al. | 210/64 |
| 3,692,625 | 9/1972 | Cutler et al. | 162/161 |

OTHER PUBLICATIONS

Chem. Abstract, vol. 60, abs. 5524h, Hayakawa et al.

*Primary Examiner*—S. Leon Bashore
*Assistant Examiner*—Peter Chin
*Attorney, Agent, or Firm*—Alexander D. Ricci; Steven H. Markowitz

[57] ABSTRACT

The present disclosure is directed to methods and agents for detaching and dispersing microbiological deposits which occur on support materials in contact with aqueous systems. The method includes adding to the aqueous medium and thereby contacting the deposits with from about 1 to 100 parts per million of an agent which possesses hydrogen-bonding characteristics. Preferred agents include but are not limited to urea, ethanolamine, water-soluble acrylamide polymers, and water-soluble reaction products of amines, and epoxy or expoxy precursor compounds and mixtures thereof.

6 Claims, No Drawings

REMOVAL OF MICROBIOLOGICAL DEPOSITS

This is a division of application Ser. No. 400,461 filed Sept. 24, 1973, now abandoned.

BACKGROUND OF THE INVENTION

The formation of slime by microorganisms is a problem which attends many systems. For example, lagoons, lakes, ponds, pools, and such systems as cooling water systems and pulp and paper mill systems all possess conditions which are conducive to the growth and reproduction of slime-forming microorganisms. In both once-through and recirculating cooling systems, for example, which employ large quantities of water as a cooling medium, the formation of slime by microorganisms is an extensive and constant problem.

Airborne organisms are readily entrained in the water from cooling towers and find this warm medium an ideal environment for growth and multiplication. Aerobic and heliotropic organisms flourish on the tower proper while other organisms colonize and grow in such areas as the tower sump and the piping and passages of the cooling system. Such slime serves to deteriorate the tower structure in the case of wooden towers. In addition, the deposition of slime on metal surfaces promotes corrosion. Furthermore, slime carried through the cooling system plugs and fouls lines, valves, strainers, etc. and deposits on heat exchange surfaces. In the latter case, the impedance of heat transfer can greatly reduce the efficiency of the cooling system.

In pulp and paper mill systems, slime formed by microorganisms is also frequently and, in fact, commonly encountered. Fouling or plugging by slime also occurs in the case of pulp and paper mill systems. Of greater significance, the slime becomes entrained in the paper produced to cause breakouts on the paper machines with consequent work stoppages and the loss of production time or unsightly blemishes in the final product which results in rejects and wasted output. The previously discussed problems have resulted in the extensive utilization of biocides in cooling water and pulp and paper mill systems. With the advent of pollution controls which prohibit discharge of biocidal materials to receiving streams without pre-treatment for removal or destruction thereof, the water-treatment industry has been exploring various methods and materials in an attempt to reduce slime problems or to enhance the effectiveness of biocidal agents.

In certain instances it is necessary to minimize and fluidize slime formation because of the ultimate effect on the products produced as in the pulp and paper industry. In other applications if the amount of slime formations can be maintained and preferably in a fluidized state, the problems associated therewith are often times minimized to a great degree and sometimes cured by the use of low feed rate biocide treatments. This is particularly the case in industrial cooling water treatment where if slime deposits can be detached or be made to slough off the structures of the cooling water structures and maintained dispersed in the water, operation of the system may be continued with little or no biocide additive.

The slimes generally found in aqueous systems are those which are bacterial and/or fungal in derivation. The primary problem causes which are generally found in water are the aerobacter bacteria and specifically *Aerobacter aerogenes*, and the penicillium and aspergillus fungi and specifically *Penicillium expansum* and *Aspergillus niger*.

As earlier explained slime formations do in fact adhere very firmly to the structures of cooling water equipment, and in particular the slats which are for the most part produced from wood. These deposits accordingly impede the flow of the water, and often times uncontrolled detachment of the slime formations cause plugging which results in lost production and, many times, shut down of the equipment for cleaning.

In an attempt to overcome these problems, it was the present inventor's feeling that if the slime growths could be detached or sloughed off the structures at a controlled rate, the slime formations could be controlled with respect to size. By keeping the slime colonies within reasonable sizes, their fluidity within the system could be ensured.

General Description of the Invention

The present inventor ascertained that if a sufficient quantity of an agent having hydrogen bonding characteristics was added to an aqueous medium wherever slime formation has occurred and was attached to a supporting member, that the slime could be sloughed off or accordingly be made to detach and be dispersed within the aqueous medium. It is believed that the agent must possess hydrogen bonding characteristics to a degree sufficient to permit penetration of the hydrated slime structure. The penetration modifies the slime structure to the extent that the slime loses its tenacity and breaks loose from the support.

Agents or compounds having a labile hydrogen atom have been found to be quite effective for this purpose. Compounds or agents which have been found to be suitable are urea, ethanolamine, water soluble polymers of acrylamide having hydrogen bonding characteristics and water soluble reaction products of amines and epoxy, or epoxy precursor compounds. Various derivatives of each which possess hydrogen bonding properties are obviously operable for the purpose. These agents have performed quite satisfactorily when added to the aqueous system at a range of from about 1 to 100 parts per million (ppm) parts of the system. While treatments at the extremes of the range do find use in the appropriate applications, most systems can be effectively treated using 10 to 75 ppm.

In some instances the agents not only possess the necessary hydrogen-bonding characteristics but also the appropriate charge to permit dispersion of the slime formations in the aqueous systems. The water soluble cationic polymers of acrylamide and the water soluble cationic reaction products of amines and epoxy or epoxy precusors have this quality since most slimes are negatively charged.

Although many polymers of the types mentioned are well known cationic polymers made by the copolymerization of acrylamide and a quaternized monomer of dimethylamino methyl or ethyl acrylate are quite effective. Polymers having molecular weights of from 100,000 to 8 million have been produced and have been used successfully for this purpose. Likewise reaction products or more specifically quaternized polymers produced from equimolar amounts of methyl or ethyl amine, dimethyl or diethyl amine and epichlorohydrin and having viscosities of 100 or more at 37% solids (25° F) have been found to be quite suitable for the purpose.

The inventor also discovered that the agents described act quite effectively for the purpose when used in conjunction with each other. For example of on a weight ratio basis 5 to 95% by weight if one is used in conjunction with 95 to 5% of a different agent, effective results have been achieved. This is particularly the case when ethanolamine is used in conjunction with urea as indicated in the following recorded test data.

Since the agents are generally water-soluble they may be conveniently mixed and solubilized in this medium to produce the composition.

Test Procedure

1. Slats were treated to produce bacterial slime by recirculating water over them with aerogenes and in particular *Aerobacter aerogenes* inoculation. About 1 week sufficed to obtain significant slime growth for testing.

2. Slats were placed in breaker with mild stirring and treatments added. Observations were made as to sloughing of slime and suspension of particles in water.

3. After 2 hours of stirring slats were withdrawn and examined for residual slime. Slime residual adherence was tested by placing under cold running tap water and observing removal ease.

4. All tests included slats treated with water and no treatment added, for comparison.

5. Treatment dosage for all tests = 50 ppm.

The results of the testing are recorded in Table 1 which follows:

Table 1

| Material or Agent Tested | Observations |
|---|---|
| Betz 1160 - amine-epichlorohydrin reaction product (equimolar) | After one hour, high suspended solids noted in aqueous system. Slime contracted and crumbled immediately upon addition of agent. Residual slime easily removed in running water. |
| Commercial Product B (Cationic Acrylamide Polymer) | Slightly less effective than 1160 in ten (10) minutes. Slime easily removed with running water. |
| Commercial Product C (Cationic-dimethyl amine epichlorohydrin polymer (equimolar) 100 cps - 37% solids - 25° F | Fair activity in 1½ hours. Slime not removed in stirring bath but easily washed off. |
| Urea | Immediate sloughing off of slime. |
| Ethanolamine | Good slime removal |
| Urea + Polystyrene sulfonate (1:1) | Excellent removal of slime and suspension best of all treatments tested |
| Urea + ethanolamine (1:1) | Results comparable to those achieved with urea and polystyrene sulfonate. Excellent removal. |

For all of the treatments tested, it was possible to observe an immediate effect upon treatment addition of slime shrinkage and crumbling.

Although the tests were conducted using wood slats as the support, the support may, of course, be metal, glass, cement surfaces, and natural and synthetic filtering mediums.

Having thus described the invention, what is claimed is:

1. A method of detaching hydrated slime adhered to a support in an aqueous medium which comprises contacting said aqueous slime with urea in an amount of from about 1 to about 100 parts per million parts of aqueous medium and to penetrate the strongly hydrated slime structure and modify such to the extent that the slime is detached from the support.

2. A method according to claim 1 wherein the slime is primarily fungal and bacterial slimes.

3. A method according to claim 2 wherein the agent is added to the aqueous medium in an amount of from about 10 to 75 parts per million parts of aqueous medium.

4. A method according to claim 3 wherein the slime is previously an *Aerobacter Aerogenes* slime.

5. A composition for detaching slime adhered to a support in an aqueous medium which consists essentially of:
   i. urea; and
   ii. at least one member of the group consisting of ethanolamine, amine-epoxy compound reaction products and derivatives of each so long as the derivatives have hydrogen-bonding characteristics, wherein the members of (i) and (ii) are present in the composition in a weight ratio of from about 5 to 95% and 95 to 5% respectively.

6. A composition according to claim 5 where the composition consists essentially of urea and ethanolamine.

* * * * *